United States Patent [19]

Takahashi et al.

[11] 4,235,745
[45] Nov. 25, 1980

[54] TITANIUM TRICHLORIDE CATALYTIC COMPONENT AND METHOD FOR HOMO-OR CO-POLYMERIZATION OF α-OLEFIN

[75] Inventors: Yoshikazu Takahashi, Hikari; Yoichi Sunada; Masaru Takitani, both of Shinnanyo, all of Japan

[73] Assignee: Toyo Stauffer Chemical Co., Ltd., Tokyo, Japan

[21] Appl. No.: 971,505

[22] Filed: Dec. 20, 1978

[30] Foreign Application Priority Data

Dec. 28, 1977 [JP] Japan ................................ 52-159997

[51] Int. Cl.$^2$ ............................................... C08F 4/64
[52] U.S. Cl. ................................ 252/429 B; 526/142; 526/144
[58] Field of Search ..................................... 252/429 B

[56] References Cited

U.S. PATENT DOCUMENTS

| | | | |
|---|---|---|---|
| 3,094,568 | 6/1963 | Hay et al. | 252/429 B X |
| 3,825,524 | 7/1974 | Wada et al. | 252/429 B X |
| 4,123,387 | 10/1978 | Shiga et al. | 252/429 B |

FOREIGN PATENT DOCUMENTS

| | | |
|---|---|---|
| 5194496 | 3/1975 | Japan . |
| 5176196 | 7/1976 | Japan . |
| 5190998 | 8/1976 | Japan . |
| 5247594 | 4/1977 | Japan . |
| 52115797 | 9/1977 | Japan . |
| 5312796 | 2/1978 | Japan . |

Primary Examiner—Patrick Garvin
Attorney, Agent, or Firm—Armstrong, Nikaido, Marmelstein & Kubovcik

[57] ABSTRACT

A titanium trichloride catalytic component suitable for preparing highly stereospecific polymers having highly uniform particle diameters from α-olefins is prepared by precipitating such catalytic component from a solution of $TiCl_4$ in a solvent comprising a saturated aliphatic hydrocarbon and/or an alicyclic hydrocarbon. Such solution is obtained by dissolving $TiCl_4$, an ether and an organo-aluminum compound having the formula $AlR_nX_{3-n}$ (wherein R, X and n are as defined hereinafter) in the solvent. The organo-aluminum compound is added at a solvent temperature not exceeding 55° C. in the concomitant presence of an aromatic hydrocarbon halide; subsequently, the temperature of the resulting system is raised to 45°–150° C. over a period of 10 minutes to 24 hours to precipitate the catalytic component which has a uniform particle diameter between 10 and 1000μ.

Homo- or co-polymerization of α-olefins is carried out in the presence of a catalyst system consisting of the above-described titanium trichloride catalytic component and an organo-aluminum compound (e.g., $(C_2H_5)_2AlCl$) to yield such polymers having highly uniform particle diameters and which are sufficiently pure to permit the omission or simplification of the conventional de-ashing and washing steps.

5 Claims, No Drawings

TITANIUM TRICHLORIDE CATALYTIC COMPONENT AND METHOD FOR HOMO-OR CO-POLYMERIZATION OF α-OLEFIN

BACKGROUND OF THE INVENTION

1. Field of the Invention

This invention relates to a high activity titanium trichloride catalytic component which is advantageously usable in the manufacture of highly stereospecific α-olefin polymers and also to a method of homo- or co-polymerization of α-olefin in which a highly crystalline polymer can be advantageously manufactured in the presence of said catalytic component and an organo-aluminum compound. More specifically stated, the invention relates to an α-olefin polymerizing titanium trichloride catalytic component which is prepared by precipitating said catalytic component from a solution prepared by dissolving titanium tetrachloride, an organic ether compound and an organo-aluminum compound having the generic formula $AlR_nX_{3-n}$ (wherein R is an alkyl group having a carbon number of 1 to 10 (i.e., 1 to 10 carbon atoms), X is a halogen or hydrogen atom and n is a real number of $0 < n \leq 3$), in a solvent comprising an aliphatic hydrocarbon and/or alicyclic hydrocarbon. The organo-aluminum compound is added at a solvent temperature of 55° C. or lower in the concomitant presence of an aromatic hydrocarbon halide and, following this, the solvent temperature is adjusted to between 45° and 150° C. over a period of time 10 minutes to 24 hours to obtain the titanium trichloride catalytic component having an uniformed particle diameter between 10 and 1000μ. This invention also relates to a method for carrying out homo- or co-polymerization of α-olefins in the presence of a catalyst system comprising the titanium trichloride catalytic component and an organo-aluminum compound.

It is the most important feature of the invention that the average particle diameter of the titanium trichloride catalytic component which is precipitated from solution in accordance with the invention is adjustable within the wide range from 10 to 1000μ as desired and that the catalytic component thus obtained is highly active when it is used for the polymerization of α-olefins. In addition, polymers of extremely uniform particle diameter can be obtained by carrying out homo- or co-polymerization of α-olefins with a catalyst which is prepared using this catalytic component in combination with an organo-aluminum compound. In case of α-olefin polymers prepared in accordance with the method of this invention, the deashing process and the washing process which are normally considered indispensable in the manufacture of an α-olefin polymer can be either omitted or simplified. Further, in accordance with this invention, a pelletizing process can also be omitted.

2. Description of the Prior Art

Nowadays, a catalytic component usable for α-olefin polymerization is required (a) to have a polymerizing activity sufficiently high to permit omission of the deashing and washing processes for removal of catalyst residue and non-stereospecific polymer from the polymer produced, (b) to have a high productivity for a stereospecific polymer and (c) to ensure that the catalytic component and the polymer produced therewith have a suitable particle diameter and a uniform particle size. The reason for such requirements lies in the fact that the catalytic components and the polymer products of conventional methods are obtained in a powdery state having uneven particle sizes which makes separating, drying and transporting them difficult. This has caused trouble in the manufacturing operations and has lowered industrial productivity.

It is also desired that a catalyst or catalytic component permits omission of a pelletizing process in the manufacture of an α-olefin. In an α-olefin polymer manufacturing plant using a titanium trichloride catalytic component which is obtained by a conventional method, the powdery polymer obtained is dried and pelletized for melting kneading, extruding and molding before it is shipped as polymer product for use in molding processes. At such an α-olefin polymer manufacturing plant, the pelletizing process is expensive and consumes a great amount of energy. Preparation of a catalytic component that permits the manufacture of a polymer which is highly homogeneous in particle diameter distribution is free of minute polymer particles would enhance the operational efficiency of the polymer manufacturing plant and eliminate troublesome process of pelletizing the polymer product. This would reduce the cost of facilities and energy consumption, thereby contributing greatly to the economical operation of the polymer manufacturing processes. Therefore, development of such an ideal catalytic component has been strongly desired.

Heretofore, Ziegler-Natta catalysts have been generally employed in the polymerization of α-olefins. A typical example of such catalysts is a catalytic system consisting of a combination of a δ-type titanium trichloride-aluminum chloride eutectic mixture (hereinafter called the δ-type eutectic mixture) and an organo-aluminum compound. The δ-type eutectic mixture is obtained by pulverizing and activating, in accordance with a known method using a ball mill, a vibration mill or the like, a γ-type titanium trichloride-aluminum chloride eutectic mixture (hereinafter called the γ-type eutectic mixture) which is obtained by reducing titanium tetrachloride with aluminum powder in the presence of aluminum chloride. However, with the δ-type eutectic mixture employed as a catalyst component for α-olefin polymerization, both polymerization activity and the productivity of stereospecific polymer are low and unsatisfactory. There have been proposed many methods for reformation the δ-type eutectic mixture, including for example: (1) A method of co-pulverizing the δ-type eutectic mixture or the γ-type eutectic mixture and a reforming agent such as an electron donor compound or allowing them to react upon each other; (2) a method of washing the γ-type or δ-type eutectic mixture with an inert hydrocarbon solvent; and (3) a method of heating the γ-type or δ-type eutectic mixture. The reformation or denaturation by these methods improves the polymerization activity of the catalytic component and the productivity of a stereospecific polymer to a certain degree. Such methods, however, are utterly incapable of controlling the particle diameter of the catalytic component and also are far from meeting the requirement of obviating the necessity of the deashing and washing processes.

Recently, there has been developed some catalytic components which have a high polymerization activity and ensure a high degree of productivity of a stereospecific polymer. An example of methods for obtaining such catalytic components is a method disclosed by Japanese laid-open patent application No. 47-34478. In this method, (1) a β-type titanium trichloride is prepared by reducing titanium tetrachloride with an organo-aluminum compound at a low temperature; (2) a portion of the aluminum compound is removed from the resulting β-type titanium trichloride eutectic mixture by treating the β-type titanium trichloride eutectic mixture with a complex-making agent; and then (3) heat-treating it in titanium tetrachloride to obtain a δ-type eutectic mixture having a dark purple color. The catalytic component is excellent-having polymerization activity several times greater than that of a catalytic component of the δ-type eutectic mixture which is prepared by the above stated pulverization process. This method for the manufacture of a catalytic component, has the following drawbacks: (1) a long period of time is required for its manufacture; (2) a large quantity of a washing liquid is required for washing the catalytic component; (3) a large quantity of waste liquid containing titanium ions and aluminum ions results; and (4) it necessitates the use of a large quantity of a neutralizing reagent and thus requires a great amount of energy to prevent environmental pollution and to recover the solvent used. This results in a very high manufacturing cost.

To eliminate the above stated drawbacks, there have been proposed improved methods for manufacturing a catalytic component. These improved methods include: (1) A method which has been disclosed in Japanese laid-open patent applications Nos. 51-16298 and 51-76196 in which a liquid matter obtained by treating titanium tetrachloride in the presence of an organic ether compound with an organo-aluminum compound expressed by a generic formula of $AlR_nX_{3-n}$ (wherein R represents an alkyl group having 1 to 10 carbon atoms; X a halogen atom; and n a real number of $0 < n \leq 3$) is brought into contact with a liberating agent such as Lewis acid at a temperature not exceeding 150° C. (2) An improvement over the above stated method (1) not using the liberating agent used in the method (1) (this improved method has been disclosed in Japanese laid-open patent application No. 52-47594). (3) A method which has been disclosed in Japanese laid-open patent application No. 51-94496 and in which a titanium trichloride catalytic component is crystallized by using seed crystals in carrying out the above state method (1). (4) A method which has been disclosed in Japanese laid-open patent application No. 51-90998 and in which a titanium trichloride catalytic component is separated out by varying the operating temperature in carrying out the above stated method (1). Each of these catalytic component manufacturing methods does not require the use of a solvent in large quantity and, accordingly, produces only a small quantity of waste liquor. However, each of them has a drawback in that the average particle diameter of the titanium trichloride catalytic component obtained by the method is at the most about 30μ and normally measures only several μ. Thus, the catalytic component is obtained in an extremely small particle size and at low bulk density which causes the catalytic component to be difficult to handle. Further, when the catalytic component is used for α-olefin polymerization, the particle diameter of the polymer product is small, its bulk density is low, and yield of stereospecific polymer is low.

As described in the foregoing, properties of the catalytic components for α-olefin polymerization manufactured by conventional methods and those of the α-olefin polymers polymerized in the presence of such catalysts are not satisfactory. Therefore, further improvement over these conventional catalytic components is desired.

The inventors of the present invention strenuously conducted studies for a method of manufacturing a titanium trichloride catalytic component which has a high degree of polymerizing activity as well as a high productivity for a stereospecific polymer and which, at the same time, permits free control of the particle diameter of such catalytic component, and also permits control of the particle diameter of the α-olefin polymer product. As a result of these studies, the applicants have completed the present invention.

SUMMARY OF THE INVENTION

It is an object of the present invention to provide a titanium trichloride catalytic component for α-olefin polymerization which is prepared by precipitating the titanium trichloride catalytic component from a solution of titanium trichloride in a solvent comprising a saturated aliphatic hydrocarbon and/or an alicyclic hydrocarbon. Such solution is obtained by dissolving (a) titanium tetrachloride; (b) an organic ether compound; and (c) an organo-aluminum compound which has the generic formula of $AlR_nX_{3-n}$ (wherein R represents an alkyl group having 1 to 10 carbon atoms (i.e., a carbon number of 1 to 10), and X represents a halogen or hydrogen atom, and n a real number of $0 < n \leq 3$) in the solvent. The organo-aluminum compound is added at a solvent temperature not exceeding 55° C. in the concomitant presence of an aromatic hydrocarbon halide; subsequently, the solvent temperature is raised to between 45° and 150° C. over a period of 10 minutes to 24 hours to precipitate a titanium trichloride catalytic component having a uniform particle diameter between 10 and 1000μ, which is freely adjustable within this range. The resulting catalytic component has a highly uniform particle diameter and a high degree of catalytic (polymerization) activity forming a stereospecific polymer at a high degree of productivity.

It is another object of the present invention to provide a method for homo- or co-polymerization of α-olefins in which the polymerization is carried out in the presence of the above-stated titanium trichloride catalytic component to obtain highly stereospecific polymers having highly uniform particle diameters.

In the present invention, it is mandatory that the solvent (which is used for dissolving, (a) the titanium tetrachloride, (b) the above-mentioned organic ether compound, and (c) the above-mentioned organo-aluminum compound) includes an aromatic hydrocarbon halide in addition to the above-mentioned saturated aliphatic hydrocarbon and/or the alicyclic hydrocarbon. This makes it possible to adjust the particle diameter of the titanium trichloride catalytic component as desired. On the other hand, if the solvent consists of only the saturated aliphatic hydrocarbon and/or the alicyclic hydrocarbon without having the aromatic hydrocarbon halide mixed therein or if the solvent consists of only the aromatic hydrocarbon halide, there is produced a titanium trichloride catalytic component of extremely fine particle size with which the objects and the effects of the present invention hardly can be attained and which is hardly usable as catalytic component for α-olefin polymerization.

This fact is an amazing discovery which has never been expected from the known prior art. The invention is of great significance for industrial applications. The titanium trichloride catalytic component has a high degree of activity and also a high productivity for a stereospecific polymer, so that the conventional deashing and washing processes can be either omitted or simplified. Further, the titanium trichloride catalytic component obtained in accordance with this invention and a polymer obtained from the use of this catalytic component respectively have highly uniform particle diameters. In addition to these advantages, the particle diameter is adjustable as desired, so that the properties such as fluidity can be adjusted to be suitable for use at any type of plant. It is another advantageous feature of the invention that the adjustability of the polymer product to any desired particle diameter makes it possible to omit a pelletizing process. The objects and the features of the invention will become more apparent from the following detailed description thereof:

DETAILED DESCRIPTION OF THE INVENTION

The halogen of the aromatic hydrocarbon halide to be used in accordance with the invention is preferably selected from the group consisting of chlorine, bromine, iodine and fluorine. Taking chlorinated aromatic hydrocarbons and brominated aromatic hydrocarbons as examples, the aromatic hydrocarbon halide may be selected from the group consisting of chlorinated aromatic hydrocarbons such as chlorobenzene, chlorotoluene, chloroxylene, chloroethyl benzene, dichlorobenzene, dichlorotoluene, dichloroxylene, trichlorobenzene, trichlorotoluene, chlorobromobenzene, etc. and brominated aromatic hydrocarbons such as bromobenzene, bromotoluene, bromoxylene, bromoethyl benzene, dibromobenzene, dibromotoluene, dibromoxylene, tribromobenzene, tribromotoluene, etc. Of these chlorinated and brominated aromatic hydrocarbons, it is preferable to use chlorobenzene, chlorotoluene, chloroxylene, dichlorobenzene, dichlorotoluene, dichloroxylene, bromobenzene, bromotoluene, bromoxylene, dibromobenzene, dibromotoluene, dibromo.

The saturated aliphatic hydrocarbon is a compound having a boiling point of at least 65° C. and preferably above 80° C. For example, the saturated aliphatic hydrocarbon may be selected from the group consisting of n-hexane, n-heptane, n-octane, and n-decane. The alicyclic hydrocarbon preferably has a boiling point of at least 65° C. and may be selected, for example, from the group consisting of cyclohexane, cycloheptane, cyclooctane, methylcyclohexane, etc.

In one of the methods for adjustment of the particle diameter of the titanium trichloride catalytic component, using an admixture of aromatic hydrocarbon halide and a saturated aliphatic hydrocarbon and/or an alicyclic hydrocarbon (hereinafter this mixture will be called the mixed solvent), the particle diameter can be controlled as desired by adjusting the concentration of the aromatic hydrocarbon halide in the mixed solvent. Further, when allowing the titanium trichloride catalytic component to separate out in the presence of the aromatic hydrocarbon halide, the temperature of the mixed solvent is raised to between 45° and 150° C., preferably to a temperature between 65° and 120° C. and most preferably to a temperature between 75° and 110° C. over a period of 10 minutes and 24 hours, preferably between 30 minutes and 12 hours and most preferably between 1 and 8 hours. The concentration of the aromatic hydrocarbon halide in the mixed solvent is 20 to 70% by volume, preferably 25 to 65% by volume and most preferably 30 to 60% by volume. Within this prescribed range of concentration, the particle diameter of the titanium trichloride catalytic component produced becomes smaller as the concentration of the aromatic hydrocarbon halide increases. Conversely, the particle diameter becomes larger as the concentration of the aromatic hydrocarbon halide decreases. The particle diameter of a titanium trichloride catalytic component produced when the concentration of the aromatic hydrocarbon halide in the mixed solvent is set, for example, at below 20% by volume is uneven and the polymerization activity and the stereospecificity of the polymer product obtained by using this catalytic component are extremely poor. On the other hand, when the concentration of the aromatic hydrocarbon halide exceeds 70% by volume, the particle diameter of a catalytic component produced thereby is so small that it makes filtering and washing for the catalytic component difficult and results in lower productivity of the catalytic component.

The titanium tetrachloride is used in the ratio of 5 mol and less to 1 liter of the aforesaid mixed solvent, preferably 2 mol and less, and most preferably 1.5 mol and less; there is no particular lower limitation to said ratio. However, in consideration of the productivity of the titanium trichloride catalytic component, it is preferable to set the lower limit at 0.01 mol.

The organic ether compound to be used in accordance with this invention is preferably a compound that is expressed by a generic forumla ROR', wherein R and R' represent alkyl groups which are the same or different from each other, at least one of them having a carbon number not exceeding 5 (i.e., not more than 5 carbon atoms). The compound may be selected from the group consisting of di-n-amyl ether, di-n-butyl ether, di-n-propyl ether, n-amyl-n-butyl ether, n-amyl isobutyl ether, n-butyl-n-propyl ether, n-butyl isoamyl ether, n-propyl-n-hexyl ether, n-butyl-n-octyl ether, etc. Of these compounds, the use of di-n-butyl ether produces the best result. The organic ether compound is used in quantity 0.8 to 3 mol for 1 mol of the titanium tetrachloride and preferably 1.0 to 2.5 mol. If the organic ether compound is used in quantity less than 0.8 mol for 1 mol of the titanium tetrachloride, the polymerizing activity of the titanium trichloride catalytic component thus produced is decreased, causing a lower degree of stereospecific polymer productivity. Also, if the quantity of the organic ether compound exceeds 3 mol for 1 mol of the titanium tetrachloride, are lowered and the polymerizing activity and the stereospecific polymer productivity are lowered and the yield of the catalytic component is also lowered.

The organo-aluminum compound to be used in accordance with this invention is preferably a compound that is expressed by a generic formula of $AlR_nX_{3-n}$, wherein R represents an alkyl group having 1–10 carbon atoms, X a halogen or hydrogen atom and n a real number of $0 < n \leq 3$. The compound in which n=3, for example, may be selected from the group consisting of trimethyl aluminum, triethyl aluminum, tri-n-propyl aluminum, tri-n-butyl aluminum, triisobutyl aluminum, tri-n-pentyl aluminum, tri-n-hexyl aluminum, triisohexyl aluminum, tri-n-octyl aluminum, etc. The compound in which X is a hydrogen atom may be selected out of the group consisting of dimethyl aluminum hydride, methyl aluminum hydride, diethyl aluminum hydride, ethyl aluminum hydride, di-n-butyl hydride, n-butyl aluminum dihydride, diisobutyl aluminum hydride, isobutyl aluminum dihydride, di-n-pentyl aluminum hydride, di-n-hexyl aluminum hydride, diisohexyl aluminum hydride, di-n-octyl aluminum hydride, etc. As for the compound in which X is a halogen atom, taking chlorides as example, the compound may be selected out of the group consisting of dimethyl aluminum chloride, diethyl aluminum chloride, di-n-propyl aluminum chloride, di-n-butyl aluminum chloride, diisobutyl aluminum chloride, di-n-pentyl aluminum chloride, di-n-hexyl aluminum chloride, diisohexyl aluminum chloride, di-n-octyl aluminum chloride, methyl aluminum sesqui-chloride, n-propyl aluminum sesquichloride, n-butyl aluminum dichloride, isobutyl aluminum dichloride, n-hexyl aluminum dichloride, isohexyl aluminum dichloride, etc. The organo-aluminum compound may be diluted to a suitable degree with an aromatic hydrocarbon such as benzene, toluene, xylene, etc., or with the aromatic hydrocarbon halide, the saturated aliphatic hydrocarbon or the alicyclic hydrocarbon which is used for the preparation of the mixed solvent in accordance with the invention, or with a mixture of them. The organo-aluminum compound is used for the purpose of reducing a tetravalent titanium to a trivalent titanium. Theoretically, addition of the organo-aluminum compound in quantity equivalent to the tetravalent titanium suffices. However, in the presence of the aromatic hydrocarbon halide, the addition quantity of the organo-aluminum compound is also interrelated with the particle diameter of the titanium trichloride catalytic component to be obtained. In view of this interrelation between the two, it is preferable to add the organo-aluminum compound in quantity 0.3 to 1.8 equivalent of the titanium tetrachloride. Addition of the organo-aluminum compound in a quantity less than 0.3 equivalent greatly lowers yield of titanium trichloride catalytic component. Conversely addition of the organo-aluminum compound in a quantity more than 1.8 equivalent lowers the polymerizing activity and the stereospecific polymer productivity. Further, within this range of addition quantity of the organo-aluminum compound, the particle diameter of the catalytic component decreases as the addition quantity increases.

As for another method for effecting adjustment of the particle diameter of the titanium trichloride catalytic component, the particle diameter can be adjusted as desired by adjusting the composition of the organic ether compound/titanium tetrachloride/organo-aluminum compound system. This requires the presence of the aromatic hydrocarbon halide; otherwise, the adjustment of the particle diameter of the titanium trichloride catalytic component obtained cannot be effected as desired. For example, when the concentrations of the organic ether compound and the titanium tetrachloride are fixed, the particle diameter of the catalytic component becomes smaller as the concentration of the organo-aluminum compound increases. Further, when the concentrations of the titanium tetrachloride and the organo-aluminum compound are fixed, the particle diameter of the catalytic component obtained decreases as the concentration of the organic ether compound increases.

Next, let us show an example of procedures for the manufacture of the titanium trichloride catalytic component of the present invention. The titanium tetrachloride and the organic ether compound are dissolved in the mixed solvent either separately or in the form of a complex. Following this, an organo-aluminum compound is added. It is necessary that the temperature of the mixed solvent does not exceed 55° C., and is preferably below 50° C. and most preferably below 45° C. when the organo-aluminum compound is added. If the organo-aluminum compound is added at a solvent temperature exceeding 55° C., the titanium tetrachloride will be immediately reduced and then the titanium trichloride catalytic component will separate in a state of minute particles. This not only makes the particle size adjustment difficult but also makes filtration and washing the catalytic component difficult, thus resulting in lowered productivity.

After addition of the organo-aluminum compound, the temperature of the mixed solvent is raised up to a temperature between 45° and 150° C., preferably between 65° and 120° C. and most preferably between 75° and 110° C. The length of time required for raising the temperature to the prescribed value is 10 minutes to 24 hours, preferably 30 minutes to 12 hours and most preferably 1 hour to 8 hours; however, this also depends upon the temperature difference between the temperature values before and after the temperature raising process or procedure. This process is required for reducing the titanium tetrachloride with the organo-aluminum compound to obtain the titanium trichloride catalytic component of highly uniform particle diameter. If the temperature is rapidly raised in a short period of time, e.g., in less than 10 minutes from temperature at which the organo-aluminum compound is added, the particle diameter of the titanium trichloride catalytic component obtained is uneven. When the temperature raising process is carried out over a long period of time, e.g., exceeding 24 hours, such a process does not bring about any particularly greater effect. On the other hand, when the temperature is less than 45° C., the reduction reaction takes place at a slow velocity which results in a poor productivity. The upper limit of the temperature must be lower than the boiling point of the compound that has the lowest boiling point among the components of the mixed solvent including, saturated aliphatic hydrocarbon or alicyclic hydrocarbon and the aromatic hydrocarbon halide. The upper limit is normally set at 150° C.

After completion of the temperature raising process, it is preferable to retain the raised temperature for a period of several minutes to several ten minutes to ensure the completion of the reducing reaction, though there is no particular restriction on the length of that period.

Through the above stated process, it is possible to obtain a novel titanium trichloride catalytic component having highly uniform particle diameter which is adjustable as desired between 10 and 1000μ. The catalytic component thus obtained is thoroughly washed with either a hydrocarbon solvent or an aromatic hydrocarbon halide solvent. After washing, the catalytic component can be stored either in a slurry-like state or in a dried state attained via filtration and drying.

The titanium trichloride catalytic component is used to form an α-olefin polymerizing catalyst system in combination with an organo-aluminum compound expressed by a generic formula of $AlR_nX_{3-n}$ wherein R represents an alkyl group (as defined supra), X a halogen atom and n a real number of $0 < n \leq 3$. The organo-aluminum compound may be selected from the group consisting of triethyl aluminum, diethyl aluminum chloride, ethyl aluminum dichloride, ethyl aluminum sesquichloride, triisobutyl aluminum, diisobutyl aluminum chloride, etc. The quantity ratio of the titanium trichloride catalytic component to the organo-aluminum compound can be varied within a wide range as desired by those skilled in the art. However, the mole ratio is normally between 1:1 and 1:20. Further, in carrying out the α-olefin polymerizing method of the invention, the catalyst system may be used in combination with an electron donor of the kind generally employed.

The polymerization may be carried out by (a) a suspension polymerization process in which an inert hydrocarbon selected from the group consisting of an aromatic hydrocarbon such as benzene, xylene, toluene etc., or an aliphatic hydrocarbon such as heptane, hexane, octane, etc., or an alicyclic hydrocarbon such as cyclohexane or cycloheptane is employed as a solvent, (b) by a liquid phase polymerization process which uses a liquefied monomer as solvent 1 or (c) by a gas phase polymerization process in which a monomer is used in a gas phase. The mode of carrying out the polymerization may be either a continuous processing mode or a batch processing mode. Polymerization temperature is set between 30° and 120° C. and preferably between 50° and 100° C. Polymerization pressure is between atmospheric pressure and 100 atm and preferably between atmospheric pressure and 50 atm.

The α-olefin that can be homo- or co-polymerized by the catalyst system of the present invention includes ethylene, propylene, butene-1,4-methyl pentene, etc. The adjustment of molecular weight of the polymer can be effected by a known method of using hydrogen or diethyl zinc.

When α-olefin is polymerized by using the titanium trichloride catalytic component in accordance with the polymerization method of the present invention, the polymerization activity is very high and the polymer thus obtained has high stereospecificity and high bulk density. With the particle size of the titanium trichloride catalytic component suitably adjusted, the resulting polymer has a highly uniform particle diameter within a range of diameters from 0.5 to 15 mm. The polymer is in an approximately spherical shape to have a good fluidity and, despite of its large particle diameter, the polymer also has a good deashing properties.

The invention will be understood more readily by reference to the following embodying examples. However, these examples are intended to illustrate the invention and are not to be construed as limiting the scope of the invention. Symbols which are used for the description of these examples and comparison examples denote the following:

a: Number of grams (g-pp) of the polymer produced in a unit period of time (hour), at a unit pressure (atm) per g (g-cat) of the catalytic component (g-pp/g-cat. hr. atm.)

p: Number of grams of the polymer produced per g of the catalytic component.

H.I.: A boiling n-heptane insoluble component in solid polymer produced (g)/solid polymer produced(g) × 100 (%)

$$I.I.: \frac{\text{Solid polymer produced (g)} \times H.I.}{\text{Solid polymer produced (g)} + \text{polymer soluble in polymerization solvent (g)}} (\%)$$

dc, dp: Average particle diameter values (μ) obtained by measuring, with a microscope, the diameters of 50 particles of each of the titanium trichloride catalytic component and the polymer obtained therefrom.

p: The bulk density (g/ml) of a boiling n-heptane insuluble polymer measured in accordance with the Method A or B of ASTM-D-1895-69.

EXAMPLE 1

Preparation of the Titanium Trichloride Catalytic Component

The inside of a four-necked flask equipped with a stirrer was purged with dry nitrogen. Following this, 250 ml of a monochlorobenzene and-n-heptane mixed solvent containing 33% by volume of monochloro benzene which was employed as the aromatic hydrocarbon halide was introduced into the flask. Then, 24.4 ml of titanium tetrachloride (0.22 mol—equivalent to 0.88 mol TiCl$_4$/l mixed solvent) was added. The mixed solution was kept at a temperature between 23° and 27° C. To this was added, by dropping with stirring, 55.6 ml of di-n-butyl ether (0.33 mol—the mole ratio of di-n-butyl ether to the titanium tetrachloride was equivalent to 1.5) over a period of 10 minutes. After completion of this dropping process, a solution prepared by dissolving 13.8 ml of diethyl aluminum chloride (0.11 mol—the addition quantity of the diethyl aluminum chloride corresponded to 1.0 equivalent of the titanium tetrachloride) in 50 ml of mono-chloro benzene was added to the mixture over a period of 40 minutes. The mixture solution was then heated up to 95° C. in 4 hours. A titanium trichloride catalytic component began to separate out as the temperature rose. To complete the separation after the temperature raising process, the solution was kept at 95° C. for 30 minutes. Following this, the separated matter was immediately filtrated in a dry nitrogen atmosphere. The cake which was obtained in this manner was washed twice with 100 ml of mono-chloro benzene and three times with 200 ml of n-heptane.

After the washing process, the cake was dried at room temperature under reduced pressure to obtain 35 g of a titanium trichloride catalytic component having highly uniform particle diameter measuring 500μ on the average.

The titanium trichloride catalytic component thus obtained was analyzed with the following results the catalytic component is composed of 27.6% by weight of Ti, 60.9% by weight of Cl, 0.19% by weight of Al and 8.4% by weight of di-n-butyl ether. Further, a result of measurement by the B.E.T. method indicated that the specific surface area of the catalytic component was 125 m$^2$/g.

Polymerization Procedures

The inside of a polymerization flask which was provided with a side arm and measured 1 liter in content volume was dried by thoroughly removing moisture therefrom. Then, the inside of the flask was purged with dry nitrogen. Following this, 400 ml of n-heptane, 106.9 mg of the titanium trichloride catalytic component and 1.6 m. mol of diethyl aluminum chloride were put in the flask. The nitrogen inside the polymerization flask was replaced with propylene. The temperature of the inside of the flask was raised up to 70° C. with vibration and stirring and, and the inside pressure of the flask was kept at 2 kg/cm$^2$G with propylene gas, the polymerization of propylene was carried out for 2.5 hours.

Upon completion of polymerization, stirring and introduction of propylene was stopped; non-reacted propylene was purged; and then the catalyst was decomposed by introducing 100 ml of an alcohol mixture consisting of methanol and isopropanol in a mixing ratio of 3:1.

The polymer produced by this polymerization process was recovered by filtration. Then 65.7 g of polypropylene was obtained through washing and drying processes. The filtrate was evaporated and dried to recover 1.4 of polypropylene which had been dissolved in the polymerization solvent. The results of polymerization were as shown in Table 1.

EXAMPLES 2-5

A titanium trichloride catalytic component was prepared by varying the composition of the mixed solvent consisting of mono-chloro benzene and n-heptane as shown in Table 1. With the exception of this, the preparation of the catalytic component and the polymerization of propylene were carried out in exactly the same manner as in Example 1. The results of the runs constituting these examples (i.e., Examples 2 to 5) were as shown in Table 1.

TABLE 1

| | Preparation of catalytic component | | Results of polymerization | | | | |
|---|---|---|---|---|---|---|---|
| Example No. | Monochloro benzene concentration (vol %) | dc | a | p | I.I. | dp | ρ |
| 1 | 33 | 500 | 82 | 615 | 95.5 | 3500 | 0.24 |
| 2 | 30 | 1000 | 72 | 540 | 91.3 | 6000 | 0.21 |
| 3 | 43 | 300 | 80 | 600 | 95.3 | 2100 | 0.30 |
| 4 | 50 | 30 | 83 | 620 | 96.0 | 400 | 0.32 |
| 5 | 60 | 10 | 83 | 622 | 95.0 | 90 | 0.24 |

EXAMPLES 6-8

The preparation of a titanium trichloride catalytic component and the polymerization of propylene were carried out in exactly the same manner as in Example 1 with the exception that: The composition of the mixed solvent consisting of monochloro benzene and n-heptane was varied as shown in Table 2 and 50 ml of n-heptane was used as diluent for the diethyl aluminum chloride. The results of the run constituting these examples were as shown in Table 2.

TABLE 2

| | Preparation of catalytic component | | Results of polymerization | | | | |
|---|---|---|---|---|---|---|---|
| Example No. | Monochloro benzene concentration (vol %) | dc | a | p | I.I. | dp | ρ |
| 6 | 46.8 | 500 | 70 | 525 | 91.2 | 3400 | 0.24 |
| 7 | 50.0 | 300 | 75 | 562 | 93.5 | 2200 | 0.28 |
| 8 | 53.2 | 10 | 80 | 600 | 95.4 | 93 | 0.27 |

EXAMPLES 9-10

The preparation of a titanium trichloride catalytic component and the polymerization of propylene were carried out in exactly the same manner as in Example 1 with the exception of that: The composition of the mixed solvent consisting of monochloro benzene and n-heptane was varied as shown in Table 3 and a mixture solution consisting of monochloro benzene and n-heptane in a ratio by volume of 1:1 was used as diluent for diethyl aluminum chloride. The results of these runs were as shown in Table 3.

TABLE 3

| | Preparation of catalytic component | | Results of polymerization | | | | |
|---|---|---|---|---|---|---|---|
| Example No. | Monochloro benzene concentration (vol %) | dc | a | p | I.I. | dp | ρ |
| 9 | 43.2 | 250 | 78 | 585 | 93.5 | 2100 | 0.28 |
| 10 | 50.0 | 60 | 81 | 607 | 95.0 | 800 | 0.31 |

EXAMPLES 11-13

The preparation of a titanium trichloride catalytic component and the polymerization of propylene were carried out in exactly the same manner as in Example 1 with the exception of that: Titanium tetrachloride was added as shown in Table 4 and diethyl aluminum chloride and di-n-butyl ether were added in amounts to make their mole ratios to the titanium tetrachloride the same as in Example 1. The results of these runs were as shown in Table 4.

TABLE 4

| | Preparation of catalytic component | | Results of polymerization | | | | |
|---|---|---|---|---|---|---|---|
| Example No. | Addition q'ty of titanium tetrachloride (ml) | dc | a | p | I.I. | dp | ρ |
| 11 | 147 | 60 | 85 | 640 | 96.9 | 820 | 0.32 |
| 12 | 110 | 40 | 51 | 380 | 95.5 | 520 | 0.31 |
| 13 | 84.6 | 25 | 33 | 250 | 90.2 | 370 | 0.25 |

EXAMPLES 14-17

The preparation of a titanium trichloride catalytic component and the polymerization of propylene were carried out in exactly the same manner as in Example 1 with the exception of that: The addition quantity of diethyl aluminum chloride was adjusted to give the equivalent ratios to titanium tetrachloride shown in Table 5. The results of these runs were as shown in Table 5.

TABLE 5

| | Preparation of catalytic component | | Results of polymerization | | | | |
|---|---|---|---|---|---|---|---|
| Example No. | Diethyl aluminum chloride/TiCl$_4$ equivalent ratio | dc | a | p | I.I. | dp | ρ |
| 14 | 0.30 | 20 | 53 | 400 | 92.3 | 250 | 0.26 |
| 15 | 1.0 | 500 | 82 | 615 | 95.5 | 3500 | 0.24 |
| 16 | 1.36 | 100 | 60 | 450 | 90.0 | 980 | 0.44 |
| 17 | 1.80 | 50 | 35 | 260 | 92.3 | 470 | 0.22 |

EXAMPLE 18-21

The preparation of a titanium trichloride catalytic component and the polymerization of propylene were carried out in exactly the same manner as in Example 1 with the exception of that the addition quantity of di-n-butyl ether was adjusted to give the mole ratios of said ether to TiCl$_4$ shown in Table 6. The results of these runs were as shown in Table 6.

TABLE 6

| Example No. | Preparation of catalytic component Di-n-butyl ether/TiCl4 mole ratio | dc | Results of polymerization | | | | |
|---|---|---|---|---|---|---|---|
| | | | a | p | I.I. | dp | p |
| 18 | 1.00 | 420 | 57 | 430 | 94.3 | 3000 | 0.32 |
| 19 | 1.82 | 50 | 67 | 500 | 93.5 | 680 | 0.24 |
| 20 | 2.00 | 40 | 64 | 483 | 91.0 | 520 | 0.22 |
| 21 | 2.50 | 30 | 60 | 450 | 90.0 | 400 | 0.21 |

EXAMPLES 22–26

The preparation of a titanium trichloride catalytic component and the polymerization of propylene were carried out in exactly the same manner as in Example 1 with the exception of that: In place of the n-heptane, various saturated aliphatic hydrocarbons and/or alicyclic hydrocarbons were used as shown in Table 7. The results of these runs were as shown in Table 7.

TABLE 7

| Example No. | Preparation of catalytic component Saturated aliphatic or alicyclic hydrocarbon | dc | Results of polymerization | | | | |
|---|---|---|---|---|---|---|---|
| | | | a | p | I.I. | dp | p |
| 22 | hexane | 200 | 77 | 580 | 93.2 | 1800 | 0.26 |
| 23 | cyclohexane | 230 | 81 | 610 | 94.8 | 2100 | 0.32 |
| 24 | Octane | 480 | 80 | 600 | 95.0 | 3500 | 0.31 |
| 25 | methyl cyclohexane | 400 | 82 | 615 | 95.2 | 3000 | 0.32 |
| 26 | n-decane | 490 | 81 | 607 | 95.1 | 3500 | 0.31 |

EXAMPLES 27–34

The preparation of a titanium trichloride catalytic component and the polymerization of propylene were carried out in exactly the same manner as in Example 1 with the exception of that various other aromatic hydrocarbon halides were used in place of monochloro benzene as shown in Table 8. The results of these runs were as shown in Table 8.

TABLE 8

| Example No. | Preparation of component Aromatic hydrocarbon halide | dc | Results of polymerization | | | | |
|---|---|---|---|---|---|---|---|
| | | | a | p | I.I. | dp | p |
| 27 | ortho-chloro toluene | 510 | 83 | 623 | 96.2 | 3600 | 0.28 |
| 28 | 1,2,4-trichloro benzene | 300 | 83 | 620 | 95.3 | 2100 | 0.30 |
| 29 | ortho-dichloro toluene | 380 | 83 | 622 | 95.1 | 2600 | 0.31 |
| 30 | para-chloro toluene | 500 | 82 | 615 | 95.8 | 3400 | 0.28 |
| 31 | bromo-benzene | 430 | 80 | 600 | 93.2 | 3000 | 0.27 |
| 32 | bromo-toluene | 250 | 71 | 530 | 90.5 | 2200 | 0.26 |
| 33 | iodo-benzene | 320 | 73 | 550 | 91.5 | 2400 | 0.28 |
| 34 | fluoro benzene | 350 | 64 | 480 | 92.3 | 2600 | 0.30 |

EXAMPLES 35–37

The preparation of a titanium trichloride catalytic component and the polymerization of propylene were carried out in exactly the same manner as in Example 1 with the exception of that various other organic ethers were used in place of di-n-butyl ether as shown in Table 9. The results of the runs consisting Examples 35–37 were as shown in Table 9.

TABLE 9

| Example No. | Preparation of catalytic component organic ether compound | dc | Results of polymerization | | | | |
|---|---|---|---|---|---|---|---|
| | | | a | p | I.I. | dp | p |
| 35 | diethyl ether | 120 | 47 | 350 | 90.3 | 1300 | 0.23 |
| 36 | di-n-propyl ether | 150 | 60 | 450 | 93.5 | 1700 | 0.30 |
| 37 | di-n-amyl ether | 170 | 69 | 520 | 94.0 | 1900 | 0.32 |

EXAMPLES 38–42

The preparation of a titanium trichloride catalytic component and the polymerization of propylene were carried out in exactly the same manner as in Example 1 with the exception of that various other organoaluminum compounds were used in place of diethyl aluminum chloride as shown in Table 10. The results of these runs were as shown in Table 10.

TABLE 10

| Example No. | Preparation of catalytic component Organo-aluminum compound | dc | Results of polymerization | | | | |
|---|---|---|---|---|---|---|---|
| | | | a | p | I.I. | dp | p |
| 38 | DEAL—H See Note 1 | 520 | 81 | 610 | 97.0 | 3600 | 0.34 |
| 39 | DIBAL—H See Note 2 | 510 | 82 | 615 | 97.1 | 3500 | 0.33 |
| 40 | EASC See Note 3 | 30 | 80 | 600 | 95.8 | 420 | 0.34 |
| 41 | EADC See Note 4 | 35 | 73 | 550 | 96.0 | 400 | 0.35 |
| 42 | DIBAC See Note 5 | 450 | 80 | 600 | 96.6 | 3000 | 0.32 |

NOTES
1 DEAL—H: diethyl aluminum hydride
2 DIBAL—H: diisobutyl aluminum hydride
3 EASC: ethyl aluminum sesqui-chloride
4 EADC: ethyl aluminum dichloride
5 DIBAC: diisobutyl aluminum chloride

EXAMPLES 43–47

In the preparation of a titanium trichloride catalytic component, the temperature at the time of addition of the diethyl aluminum chloride and/or the heating temperature was varied as shown in Table 11. With the exception of this the catalytic component was prepared in exactly the same manner as in Example 1 and propylene was polymerized using the thus prepared catalylic component) in exactly the same manner as in Example 1. The results of these runs were as shown in Table 11.

TABLE 11

| Example No. | Preparation of catalytic component | | | Results of polymerization | | | | |
|---|---|---|---|---|---|---|---|---|
| | Addition temp., °C. | Heating temp., °C. | dc | a | p | I.I. | dp | p |
| 43 | 40 | 95 | 430 | 80 | 600 | 93.8 | 3200 | 0.25 |
| 44 | 50 | 95 | 13 | 15 | 110 | 82.3 | 110 | 0.21 |
| 45 | 27 | 70 | 400 | 56 | 420 | 87.8 | 2900 | 0.24 |
| 46 | 27 | 80 | 450 | 83 | 620 | 95.0 | 3400 | 0.24 |
| 47 | 27 | 120 | 470 | 82 | 618 | 95.6 | 3600 | 0.25 |

EXAMPLE 48-50

In each of three runs (Examples 48-50), the inside of a 2-liter stainless steel autoclave was purged with dry nitrogen; then, in the respective runs, the autoclave was filled with 160 mg of the respective titanium trichloride catalytic component prepared as shown in Table 12, 5 m. mol of diethyl aluminum chloride and 1 liter of dry n-heptane in a dry nitrogen gas atmosphere. Following this, in each run, 5 m. mol of hydrogen gas was introduced into the autoclave and the inside temperature of the autoclave was then raised by heating to 70° C.

Then, in each run propylene was supplied into the autoclave with pressure and the polymerization thereof was carried out for 2 hours by keeping the temperature and pressure inside of the autoclave at 70° C. and 10 kg/cm$^2$G respectively. Upon completion of each polymerization, propylene gas remaining in the autoclave was purged; then, the catalytic component was decomposed by injecting 100 ml of a mixture solution consisting of methanol and isopropanol in the ratio of 3:1. The suspension of polymer produced was, in each instance, filtrated, washed and dried under reduced pressure to obtain a solid polymer. Also, in each instance, a soluble polymer which was dissolved in the polymerization solvent was collected by evaporating the solvent. The results of the runs constituting Examples 48-50 were as shown in Table 12.

TABLE 12

| Example No. | Catalytic component | Results of polymerization | | | | |
|---|---|---|---|---|---|---|
| | | a | p | I.I. | dp | ρ |
| 48 | Catalytic component of Example 1 | 134 | 2960 | 96.4 | 10500 | 0.27 |
| 49 | Catalytic component of Example 3 | 130 | 2860 | 96.0 | 6200 | 0.36 |
| 50 | Catalytic component of Example 11 | 125 | 2750 | 95.5 | 3300 | 0.46 |

EXAMPLE 51

The inside of a 2-liter stainless steel autoclave equipped with a stirrer was purged with dry nitrogen. Then, 44.5 mg of a titanium trichloride catalytic component prepared in exactly the same manner as in Example 1 and 4 m. mol of diethyl aluminum chloride were put in the autoclave. Following this, 10 m. mol of hydrogen and 500 g of liquefied propylene was introduced into the autoclave with pressure to carry out polymerization for one hour at 80° C. After one hour of polymerization, heating and stirring were stopped and non-reacted propylene was purged to obtain 134.4 g of a polymer. The results of the polymerization were: a=75, p=3020, H.I.=95.3, dp=12000 and ρ=0.30.

EXAMPLE 52

The inside of a stainless steel autoclave measuring 2 liters in content volume and being equipped with a stirrer was purged with dry nitrogen before starting the run. Then 50 g of stereospecific polypropylene which had been prepared by extracting an atactic polypropylene with boiling n-heptane and then drying, and classifying it and subjecting it to deoxidization was put in the autoclave. Following this, 43 mg of a titanium trichloride catalytic component which had been prepared in exactly the same manner as in Example 1 and 100 ml of n-heptane containing 4 m. mol of diethyl aluminum chloride were put in the autoclave. Then, the temperature inside the autoclave was adjusted to 70° C. and feeding a supply of propylene into the autoclave was started to carry out gas phase polymerization under a pressure of 25 kg/cm$^2$G. After two hours, the stirring, heating, and propylene were stopped and non-reacted propylene feeding was purged. 183.3 g of polypropylene was obtained. The results of this polymerization were: a=60, p=3100, H.I.=93.7, dp=9500 and ρ=0.26.

EXAMPLE 53

One liter of n-heptane, 5 m. mol of diethyl aluminum chloride and 50 mg of titanium trichloride which was prepared in exactly the same way as in Example 1 were put in a 2-liter stainless steel autoclave equipped with a stirrer. The inside temperature of the autoclave was raised by heating up to 70° C. An ethylene-propylene mixture gas containing 4.5% by volume of ethylene was introduced into the autoclave to carry out the desired polymerization. After 2 hours, heating, stirring and introduction of the mixed gas (ethylene-propylene mixture) were stopped; non reacted mixed gas was purged; and the content of the autoclave was filtered, washed and dried to obtain 157.5 g of a polymer. The polymer was analyzed by means of infrared absorption spectrum; it was found that the polymer contained 2.9% ethylene by weight. The results of this polymerization run were: a=143, p=3150, I.I.=80.5 and ρ=0.21.

EXAMPLE 54

A titanium trichloride catalytic component was prepared and propylene was polymerized in exactly the same manner as in Example 1 with the exception of that, in the preparation of the titanium trichloride catalytic component, the addition quantity of di-n-butyl ether was 0.5 mol for 1 mol of titanium tetrachloride. The results of the polymerization were: dc=15, a=7, p=50, I.I.=65.5 and dp=200.

EXAMPLE 55

A titanium trichloride catalytic component was prepared in exactly the same way as in Example 1 with the exception of that 4 mol of di-n-butyl ether was added for 1 mol of titanium tetrachloride. By this, 20 g of the catalytic component was obtained. Then, using this catalytic component, polymerization of propylene was carried out in exactly the same way as in Example 1 to obtain the following results: a=45, p=337 and I.I.=82.5.

COMPARISON EXAMPLE 1

A titanium trichloride catalytic component was prepared in exactly the same way as in Example 1 with the exception of that a mixture solution consisting of toluene and n-heptane was used in place of the mixed solvent consisting of monochlorobenzene and n-heptane. However, in this instance in the preparation process, the product which separated out was a large massive matter and was of a shape which was not suitable for use as a catalytic component. The massive matter was therefore pulverized. Using the pulverized matter as a titanium trichloride catalytic component, polymerization was carried out in exactly the same manner as in Example 1 to obtain the following results: a=35, p=263, I.I.=88.5 and ρ=0.29.

COMPARISON EXAMPLES 2-4

A titanium trichloride catalytic component was prepared and polymerization of propylene was carried out therewith in exactly the same way as in Comparison Example 1 with the exception of that, in the preparation of the titanium trichloride catalytic component, the composition of the mixture solution of toluene and n-heptane was varied as shown in Table 13. The results of the polymerization were also as shown in Table 13. It was impossible to adjust the particle diameter of the catalytic component and that of the polymer.

TABLE 13

| Comparison Example No. | Preparation of catalytic component | | Results of polymerization | | | | |
|---|---|---|---|---|---|---|---|
| | Concentration of toluene (vol %) | dc | a | p | I.I. | dp | $\rho$ |
| 2 | 20 | — | 77 | 577 | 93.0 | — | 0.28 |
| 3 | 40 | — | 82 | 615 | 90.1 | — | 0.31 |
| 4 | 60 | — | 81 | 607 | 89.0 | — | 0.27 |

COMPARISON EXAMPLE 5

A titanium trichloride catalytic component was prepared in exactly the same way as in Example 1 with the exception of that the mixture solution consisting of monochlorobenzene and n-heptane contained by volume 10% monochloro benzene. However, the catalytic component obtained in this manner was not sufficiently uniform in particle diameter distribution, (dc=12). Polymerization of propylene was carried out using this catalytic component also in exactly the same way as in Example 1 to obtain the following results: a=25, p=187 and I.I.=78.5.

COMPARISON EXAMPLE 6

A titanium trichloride catalytic component was prepared in exactly the same way as in Example 1 with the exception of that the mixed solvent consisting of monochlorobenzene and n-heptane contained by volume 80% monochloro benzene. However, the matter which separated out through the process contained a great amount of minute particles of less than dc=7. Because of the filtration and washing processes were very difficult to carry out. After drying, the matter thus obtained was in a minute powery state with a low bulk density; it was found difficult to handle. Polymerization of propylene was carried out with the thus prepared catalytic component in exactly the same way as in Example 1 to obtain the following results: a=75, p=562, I.I.=92.5, dp=65 and $\rho$=0.18.

COMPARISON EXAMPLE 9

A titanium trichloride catalytic component was prepared in exactly the same way as in Example 1 with the exception of that the temperature at which the organo-aluminum compound was added at 65° C. The catalytic component which was obtained in this manner contained a great amount of minute particles and was insufficiently uniform in particle diameter distribution. The properties of the polymerized product prepared by using this catalytic component were: a=57, p=428 and I.I.=91.4 which were satisfactory. However, a polymer which was obtained by using this catalytic component contained a great amount of minute particles and also had uneven particle diameter distribution.

COMPARISON EXAMPLE 10

The preparation of a catalytic component and the polymerization of propylene were carried out in exactly the same way as in Example 40 with the exception of that, in the preparation of the catalytic component, the process of raising the temperature from 45° to 95° C. was carried out in 5 minutes. The results of the polymerization were: a=75, p=562, I.I.=93.5 and $\rho$=0.30. The particle diameter of the catalytic component and that of the polymer product were not sufficiently uniform and they contained, respectively, a great amount of minute powder and minute particles.

What is claimed is:

1. A titanium trichloride catalytic component for polymerization of $\alpha$-olefin obtained in the following manner: in having a titanium trichloride catalytic component separate out of a solution of saturated aliphatic hydrocarbon and/or alicyclic hydrocarbon in which titanium tetrachloride, an organic ether compound of the formula ROR', wherein one of R and R' is alkyl of 1-8 carbons and the other is alkyl of 1-5 carbons, and an organo-aluminum compound of the formula $AlR_nX_{3-n}$, wherein R is alkyl of 1-10 carbons, X is halogen or hydrogen and n is an integer of $0<n\leq 3$, are dissolved, said organo-aluminum compound is added at a solvent temperature not exceeding 55° C. in the presence of 20 to 70% by volume of an aromatic hydrocarbon halide in the mixed solvent formed thereby; and, after addition of said organo-aluminum compound, the solvent temperature is raised to a value between 45° and 150° C. over a period of time between 10 minutes and 24 hours to allow a titanium trichloride catalytic component having highly uniform particle diameter, the average value of which is adjustable as desired between 10 and 1000$\mu$ to separate out of said solvent.

2. A titanium trichloride catalytic component according to claim 1, wherein said aromatic hydrocarbon halide is an aromatic hydrocarbon chloride and/or an aromatic hydrocarbon bromide.

3. A titanium trichloride catalytic component according to claim 1 or claim 2, wherein said saturated aliphatic hydrocarbon is of a boiling point at least 65° C.

4. A titanium trichloride catalytic component according to claim 1 or claim 2, wherein said alicyclic hydrocarbon is of a boiling point at least 65° C.

5. A titanium trichloride catalytic component according to claim 1 or claim 2, wherein said titanium tetrachloride is used in quantity not exceeding 5 mol for 1 liter of said mixed solvent; said organic ether compound is used in quantity 0.8 to 3 mol for 1 mol of said titanium tetrachloride; and said organo-aluminum compound is 0.3 to 1.8 equivalent of said titanium tetrachloride.

* * * * *